(12) United States Patent
Marcel et al.

(10) Patent No.: US 11,086,054 B2
(45) Date of Patent: Aug. 10, 2021

(54) SOLID STATE THERMOCHROMIC DEVICE, AND METHOD FOR PRODUCING SAID DEVICE

(71) Applicants: COMMISSARIAT A L'ENERGIE ATOMIQUE ET AUX ENERGIES ALTERNATIVES, Paris (FR); CENTRE NATIONAL D'ETUDES SPATIALES, Paris (FR)

(72) Inventors: Corinne Marcel, Tours (FR); Frederic Sabary, La Riche (FR); Xavier Verdalet Guardiola, Frouzins (FR); Stephanie Remaury, Auriac/Vendinelle (FR)

(73) Assignees: COMMISSARIAT A L'ENERGIE ATOMIQUE ET AUX ENERGIES ALTERNATIVES, Paris (FR); CENTRE NATIONAL D'ETUDES SPATIALES, Paris (FR)

( * ) Notice: Subject to any disclaimer, the term of this patent is extended or adjusted under 35 U.S.C. 154(b) by 341 days.

(21) Appl. No.: 16/320,142

(22) PCT Filed: Jul. 26, 2017

(86) PCT No.: PCT/FR2017/052092
§ 371 (c)(1),
(2) Date: Jan. 24, 2019

(87) PCT Pub. No.: WO2018/020160
PCT Pub. Date: Feb. 1, 2018

(65) Prior Publication Data
US 2019/0243036 A1   Aug. 8, 2019

(30) Foreign Application Priority Data
Jul. 28, 2016   (FR) ...................................... 1657316

(51) Int. Cl.
*B32B 15/04*   (2006.01)
*B32B 17/06*   (2006.01)
(Continued)

(52) U.S. Cl.
CPC ........... *G02B 5/0858* (2013.01); *B64G 1/226* (2013.01); *B64G 1/58* (2013.01); *C03C 17/36* (2013.01);
(Continued)

(58) Field of Classification Search
CPC ........ G02B 5/0858; B64G 1/58; B64G 1/226; C03C 17/3626; C03C 17/3644
(Continued)

(56) References Cited

U.S. PATENT DOCUMENTS

| 3,834,793 A | 9/1974 | McConnell et al. |
| 4,401,690 A * | 8/1983 | Greenberg ............ C03C 17/245 |
| | | 427/109 |

(Continued)

FOREIGN PATENT DOCUMENTS

| FR | 2 809 388 A1 | 11/2001 |
| FR | 2 856 802 A1 | 12/2004 |

(Continued)

OTHER PUBLICATIONS

International Search Report dated Sep. 20, 2017 in PCT/FR2017/052092 filed Jul. 26, 2017.
(Continued)

*Primary Examiner* — Lauren R Colgan
(74) *Attorney, Agent, or Firm* — Oblon, McClelland, Maier & Neustadt, L.L.P.

(57) ABSTRACT

A solid-state thermochromic device and method for producing the device, the device including: a stack successively including, from a rear face to a front face exposed to solar radiation: a) a solid substrate of an inorganic material
(Continued)

resistant up to a temperature of 550° C.; b) an infrared-reflective layer of an electronically conductive material; c) electronically insulating interface layers; d) an electronically insulating inorganic dielectric layer transparent to infrared radiation, of cerium oxide CeO2, with a thickness between 400 and 900 nm; e) electronically insulating interface layers; f) a layer of an infrared-active thermochromic material, an n-doped $VO_2$ vanadium oxide, and crystallized in a monoclinic or rutile phase, with a thickness between 30 and 50 nm; and g) a solar-protective coating, transparent to infrared radiation.

31 Claims, 5 Drawing Sheets

(51) Int. Cl.
| | |
|---|---|
| *G02B 5/08* | (2006.01) |
| *B64G 1/22* | (2006.01) |
| *C03C 17/36* | (2006.01) |
| *B64G 1/58* | (2006.01) |
| *C09K 9/00* | (2006.01) |
| *G02B 7/00* | (2021.01) |

(52) U.S. Cl.
CPC ...... *C03C 17/3626* (2013.01); *C03C 17/3644* (2013.01); *C03C 17/3681* (2013.01); *C09K 9/00* (2013.01); *G02B 7/008* (2013.01)

(58) Field of Classification Search
USPC .................. 428/426, 428, 699, 701, 702
See application file for complete search history.

(56) References Cited

U.S. PATENT DOCUMENTS

| | | | | |
|---|---|---|---|---|
| 6,358,307 | B1* | 3/2002 | Legrand | C09D 7/68 |
| | | | | 106/479 |
| 6,399,228 | B1* | 6/2002 | Simpson | B05D 5/065 |
| | | | | 428/699 |
| 7,265,890 | B1 | 9/2007 | Demiryont | |
| 7,691,435 | B2 | 4/2010 | Keller et al. | |
| 7,761,053 | B2 | 7/2010 | Kruzelecky et al. | |
| 8,422,113 | B2* | 4/2013 | Moon | C03C 17/3417 |
| | | | | 359/288 |
| 10,788,723 | B2* | 9/2020 | Rozbicki | C23C 14/081 |
| 2002/0037421 | A1* | 3/2002 | Arnaud | C03C 17/3417 |
| | | | | 428/472 |
| 2004/0155154 | A1 | 8/2004 | Topping | |
| 2008/0038454 | A1* | 2/2008 | Keller | C23C 28/42 |
| | | | | 427/162 |
| 2012/0064265 | A1 | 3/2012 | Suh et al. | |
| 2014/0139904 | A1 | 5/2014 | Hendaoui et al. | |
| 2015/0203398 | A1 | 7/2015 | Meyer et al. | |
| 2015/0362763 | A1* | 12/2015 | Wheeler | G01J 5/20 |
| | | | | 359/288 |
| 2016/0018714 | A1 | 1/2016 | Marcel et al. | |
| 2016/0033174 | A1* | 2/2016 | Mercs | C23C 28/042 |
| | | | | 359/359 |
| 2017/0158554 | A1* | 6/2017 | Ko | C23C 14/3464 |

FOREIGN PATENT DOCUMENTS

| | | | |
|---|---|---|---|
| JP | 2000-137251 | A | 5/2000 |
| JP | 2008-045207 | A | 2/2008 |
| WO | WO 02/082172 | A1 | 10/2002 |

OTHER PUBLICATIONS

French Preliminary Search Report dated May 2, 2017 in French Application 16 57316 filed Jul. 28, 2016.

Tazawa, M. et al., "New material design with $V_{1-x}W_xO_2$ film for sky radiator to obtain temperature stability," Solar Energy, vol. 64, No. 1-3, Sep. 1, 1998, pp. 3-7, XP 000667634.

Koo, H. et al., "The Effect of $CeO_2$ Antireflection Layer on the Optical Properties of Thermochromic $VO_2$ Film for Smart Window System," Journal of Materials Engineering and Performance, vol. 23, No. 2, Nov. 15, 2013, pp. 402-407.

Koo, H. et al. "Effect of Oxide Buffer Layer on the Thermochromic Properties of $VO_2$ Thin Films," Journal of Materials Engineering and Performance, vol. 22, No. 12, Oct. 1, 2013, pp. 3967-3973.

Li, S.-Y. et al., "Thermochromic fenestration with $VO_2$-based materials: Three challenges and how they can be met," Thin Solid Films, vol. 520, 2012, pp. 3823-3828.

Wang, X. et al., "Fabrication of $VO_2$-based multilayer structure with variable emittance," Applied Surface Science, vol. 344, 2015, pp. 230-235.

Haddad, E. et al., "Tuneable emittance thin film coatings for thermal control," Society of Automotive Engineers, Inc. Proceedings, 2009, pp. 2575-2587.

Hendaoui, A. et al., "Highly tunable-emittance radiator based on semiconductor-metal transition of $VO_2$ thin films," Applied Physics Letters, vol. 102, 2013, pp. 061107-1-061107-4.

Japanese Office Action dated Mar. 15, 2021, issued in Japanese Patent Application No. 2019-503933.

* cited by examiner

SOLID STATE THERMOCHROMIC DEVICE, AND METHOD FOR PRODUCING SAID DEVICE

TECHNICAL AREA

The invention relates to a solid-state (all-solid) thermochromic device.

More specifically, the invention relates to a solid-state (all-solid) thermochromic device that is active in the infrared, and refers to any solid state comprising an inorganic stack of thin layers with a layer of a thermochromic material based on vanadium oxide IV, $VO_2$.

More precisely still, the device according to the invention is a solid state thermochromic device with emissivity that may be modulated in the infrared (IR) and with low solar absorptivity.

The term "solid-state device" ("all-solid device") is understood to mean a device consisting solely of inorganic materials that are solid at room temperature.

The invention further relates to a method for producing said device.

The technical field of the invention may, in general, be defined as that of so-called "solid state" (all-solid) devices active in the infrared, operating in the infrared, or infrared operating.

Such devices may be used, in particular, in spatial applications for the thermal protection of satellites.

PRIOR ART

There are currently two classes of devices, systems, active in the infrared, operating in the infrared, namely, firstly, electrochromic devices, systems, and, secondly, thermochromic devices, systems.

With respect first to electrochromic devices, systems, operating in the infrared, there are currently two major families of electrochromic devices, systems, active in the infrared, namely organic devices that may be called "all organic" devices exclusively based on organic polymers, and inorganic devices called "solid state" ("all-solid") devices consisting of stacks of inorganic or mineral layers.

Apart from these large families, there are also so-called hybrid devices that combine organic materials and inorganic materials.

Among organic electrochromic devices, there are flexible systems based on variable absorbents conductive polymers on a gold membrane that is porous, and reflective of IR. Such devices present a risk of delamination of the interfaces, particularly on the front face, unless a complex preparation and activation process is implemented.

Among organic electrochromic devices, there are also robust systems that are less fragile than the flexible devices described above, i.e. without the risk of delamination, such as "interpenetrated polymer networks with adjustable emissivity".

However, organic electrochromic devices remain difficult to adapt to spatial conditions for the thermal protection of satellites, because the polymers are sensitive to extreme temperatures and to UV, while the liquid electrolytes present a risk of leakage and/or of irreversible deformation when put under a high (secondary) vacuum.

Inorganic electrochromic devices are more resistant than their organic counterparts, but their integration still requires the implementation of electrical contacts and a voltage control management system, because their emissivity varies with their redox potential through electrochemical activation.

Examples of such devices are given in U.S. Pat. No. 7,265,890 and US-A1-2016/0018714.

With respect now to thermochromic devices, systems, operating in the infrared, these devices have the advantage of not having to be activated electrochemically, and therefore of not requiring electrodes. This is why thermochromic "tiles" (or "patches") are much more interesting than electrochromic ones in terms of integration, on a satellite wall, or on glazing for buildings or automobiles.

Among thermochromic devices, systems, operating in the infrared, on the one hand, there are devices, systems, that aim at obtaining a good energy efficiency or, more simply, systems for energy efficiency, and, on the other hand, there are devices, systems, with variable emissivity for spatial applications.

The devices, systems, for energy efficiency are intended for applications in the field of glazing, and must combine visual and thermal comfort.

The active material of these devices is generally made of bronze-colored vanadium oxide that becomes an infrared reflector at high temperature (i.e. at a temperature above the temperature, referred to as the switching temperature Tc, which is 68° C. in the case of $VO_2$).

By doping $VO_2$ in particular with tungsten, this switching temperature Tc may be lowered to around 25° C. as described in the document by S-Y Li, G. A. Niklasson, C. G. Granqvist "Thermochromic fenestration with $VO_2$-based materials: Three challenges and how they can be met", Thin Solid Films 520 (2012) 3823-3828.

Examples of these thermochromic devices, systems, for energy efficiency are given in documents FR-A1-2809388, FR-A1-2856802, US-A1-2015/0203398, US-A1-2012/0064265 and US-A1-2015/0362763.

In variable emissivity devices, systems, for spatial applications, the same active material, namely doped $VO_2$ is used. These spatial applications require, compared to glazing applications, an operating range displaced towards lower temperatures, namely an operating range between −30° C. and +100° C., for example between −20° C. and +68° C. This operating range varies as a function of the type of satellite.

Therefore, these devices require a very good quality of doping that may be achieved by the magnetron cathode sputtering technique. In this regard, reference may be made to U.S. Pat. No. 7,761,053.

The document by K. Wang, Y. Cao, Y. Zhang, L. Yan, Y. Li, "*Manufacturing of $VO_2$-based multilayer structure with variable emittance*", Applied Surface Science 344 (2015) 230-235], gives an example of a variable emissivity device, system, for spatial applications, wherein a switching temperature of 5° C. was reached with a 50 nm layer of $VO_2$ doped with 3% W, deposited on a 900 nm layer of $HfO_2$ on a silver background. An infrared optical contrast $\Delta\varepsilon$ of 0.37 is thus obtained.

In fact, in order to give the system high emissivity when hot, the thermochromic material, deposited in a very thin layer (generally of a thickness of 10 to 80 nm), must be isolated from the reflective wall by a dielectric layer that is transparent to infrared IR radiation and is very thick (about 1 μm). In this respect, reference may be made to US-A1-2014/0139904.

In addition, these devices require a solar protection layer on the front face of the device, which does not interfere with the operation of the active material. This layer must therefore reflect the solar spectrum over the 0.28 to 2.5 μm wavelength range, and remain transparent to infrared IR radiation with a wavelength of 2.5 to 25 μm.

Examples of thermochromic devices, systems, with variable emissivity for spatial applications are given in various documents.

In document U.S. Pat. No. 7,691,435, the solar reflection properties of the active material, which is $VO_2$, in the form of a layer with a thickness of 10 to 96 nm, are reinforced by the introduction of alternating silicon layers with a thickness of 11 to 250 nm on an aluminized background, wherein the main reflecting layer is composed of a $MgF_2$/ZnS multi-centered Bragg mirror.

The document by E. Haddad et al. "Tuneable emittance thin film coatings for thermal control", in: society of automotive engineers, Inc. Proceedings (2009), 2009-01, 2575-2587 describes a stack based on $VO_2$/$SiO_2$ capable of lowering a (solar absorptivity) from 0.57 to 0.32.

With respect to the methods for preparing thermochromic solid-state, all-solid, devices, systems, operating in the infrared, these methods use different technologies to prepare each of the layers of the solid state inorganic stack of the device.

For example, the paper by A. Hendaoui, N. Emond, M. Chaker and E. Haddad "*Highly tunable-emittance radiator based on semiconductor-metal transition of $VO_2$ thin films*", Applied Physics Letters 102, 061107 (2013), describes the preparation of a thermochromic device in which the $SiO_2$ dielectric layer is deposited by PECVD, wherein the reflective background is deposited by cathode sputtering, and the $VO_2$ layer is deposited by laser ablation. Therefore, three different machines must be used to prepare the device.

The document by K. Wang, Y. Cao, Y. Zhang, L. Yan, Y. Li, "Fabrication of $VO_2$-based multilayer structure with variable emittance," Applied Surface Science 344 (2015) 230-235, describes the preparation of a thermochromic device, wherein the dielectric layer of $HfO_2$ is deposited by evaporation, while the silver reflector background and the thermochromic layer made of $VO_2$ doped with tungsten, are prepared by cathode sputtering.

Two different machines must therefore be used to prepare the device.

The essential disadvantage of the solid state thermochromic devices of the prior art described above lies in the fact that the $SiO_2$ and $HfO_2$ dielectric layers have phonons bands between 9 and 16 μm which generate strong absorptions that may reduce the performances of the devices.

In view of the foregoing, there is thus a need for a thermochromic device, active in the infrared, in particular with adjustable emissivity in the infrared (IR), that does not suffer from this drawback.

In view of the above, there is still a need for a robust thermochromic device, active in the infrared, that offers high mechanical strength, is resistant to high temperatures, for example greater than or equal to 100° C., is resistant to ultraviolet radiations, and which may be placed in an environment where vacuum reigns, for example in space.

There is also a need for a device that may be manufactured by a simple method with a limited number of steps and of reduced duration.

The goal of the present invention is to provide a thermochromic device, active in the infrared, which meets, among other things, the needs listed above.

Finally, the goal of the present invention is to provide a device which does not suffer from the disadvantages, limitations, defects and drawbacks of the devices of the prior art, and which solves the problems of the devices of the prior art.

DESCRIPTION OF THE INVENTION

This goal, and other goals, are achieved, in accordance with the present invention, by a solid-state thermochromic device comprising a stack, wherein said stack comprises, preferably consists of, successively, from a rear face to a front face exposed to solar radiation:
  a) a solid substrate made of an inorganic material resistant up to a temperature of 550° C., in particular up to a temperature of 540° C., for example up to a temperature of 500° C.;
  b) an infrared-reflective layer made of an electronically-conductive material;
  c) electronically insulating interface layers;
  d) an electronically insulating inorganic dielectric layer transparent to infrared radiation, made of cerium oxide $CeO_2$, having a thickness of 400 to 900 nm, preferably 700 to 900 nm;
  e) electronically insulating interface layers;
  f) a layer of an infrared-active thermochromic material, which is an n-type doped $VO_2$ vanadium oxide, and crystallized in a monoclinic or rutile phase, having a thickness of 30 to 50 nm, preferably of 30 to 40 nm;
  g) a solar protective coating, solar reflective coating, transparent to infrared radiation.

Generally, the solid substrate is made of an inorganic material resistant up to a temperature of 550° C., in particular up to a temperature of 540° C., for example up to a temperature of 500° C., in an argon and oxygen atmosphere containing at least 96% by volume of argon.

The term "infrared-reflective layer b)", is understood to mean that this layer is always reflective in the range of mid infrared (IR), namely for wavelengths of 2.5 to 25 μm, and that it is also, possibly, preferably, reflective in the near IR of 0.78 to 2.5 μm, as this contributes to reducing solar absorptivity: it is, in particular, the case of a layer of silver with a thickness of 100 nm, but not of metal oxide layers because they are not sufficiently conductive.

The term "electronically insulating dielectric layer transparent to infrared radiation d)" is understood to mean that this layer is transparent to mid infrared radiation of 2.5 to 25 μm.

The term "solar protective coating g) transparent to infrared radiation" is understood to mean that this coating is transparent to mid infrared radiation of 2.5 to 25 μm, with an absorption peak at 9 μm.

The term "solar protective coating, solar reflective coating," is understood to mean that this coating reflects solar radiation over the entire range of solar radiation, namely from 0.28 μm to 2.5 μm.

In addition, the term "all of the infrared" encompasses the near IR of 0.78 to 2.5 μm, the mid IR of 2.5 to 25 μm, and the far IR of 25 μm to 100 μm.

Advantageously, the solid substrate is made of a material selected from silicon, borosilicate glasses, and aluminum.

Advantageously, the solid substrate is in the form of a layer, preferably of a layer having a thickness of 0.3 to 1 mm, for example a thickness of 0.5 mm.

The infrared-reflective layer made of an electronically-conductive material b), perhaps also referred to as the reflective background.

Preferably, the electronically-conductive material of layer b) is selected from metals such as noble metals like gold, silver or platinum; aluminum and chromium; metal alloys;

and electronically-conductive metal oxides transparent in the visible range, such as tin-doped indium oxide (ITO), fluorine-doped tin oxide (FTO), antimony-doped tin oxide (ATO), or aluminum-doped zinc oxide (AZO); more preferably the reflective layer is made of silver.

The reflective layer has between 60 and 100% reflectivity in the infrared, preferably 100%.

More precisely, the reflective layer has 100% reflectivity when it is made of a material selected from among metals and metal alloys. This is particularly the case when the device according to the invention is intended to equip satellite walls that do not need to be transparent.

The reflective layer has from 60% to 80% reflectivity when it is made of a material chosen from among electronically conductive metal oxides that are transparent in the visible range. This is particularly the case when the device according to the invention is intended to be used, for example, in glazing for buildings or automobiles, because these oxides are less conductive than metals and thus less reflective of IR.

Advantageously, the reflective layer b) has a thickness of 80 to 150 nm, preferably 100 nm.

The interface layers c) make it possible to ensure the adhesion of the dielectric layer d) on the reflective layer b).

Advantageously, the interface layers c) are 2 in number.

Advantageously, the interface layers c) have a total thickness of 10 to 30 nm.

The choice of materials for these interface layers is guided by the cost of the target materials which must be as low as possible.

Advantageously, the interface layers c) comprise, starting from the reflective layer, a first layer consisting of $Si_3N_4$ or AlN, then a second layer consisting of $SiO_2$ or $Al_2O_3$.

In fact, the cost of the target materials Si and Al is particularly low.

The nitrided, first layer allows passivation of the reflective layer when it is made of a metal or a metal alloy such as silver, which oxidizes easily. This nitrided, first layer may therefore be considered as indispensable in the case of silver.

This nitrided, first layer is also useful for the adhesion of $CeO_2$ on other metals or metal oxides.

The oxidized, second layer ensures, for its part, the cohesion of the cerium oxide.

Advantageously, the first layer consisting of $Si_3N_4$ or AlN, has a thickness of 5 to 15 nm, for example 10 nm, and the second layer consisting of $SiO_2$ or $Al_2O_3$, has a thickness of 5 to 15 nm, for example 10 nm.

The interface layers e) make it possible to prevent any chemical reaction between the thermochromic layer f) and the electronic insulating dielectric layer that is transparent to infrared radiation d).

Advantageously, interface layers e) are two in number.

Advantageously, the interface layers e) have a total thickness of 105 to 155 nm.

The choice of the materials of these interface layers is guided by the cost of the target materials which must be as low as possible, and by the neutrality (lack of reactivity) of the materials of these interface layers with respect to the vanadium oxide.

Advantageously, the interface layers e) comprise, starting from the dielectric layer, a first layer consisting of $SiO_2$, then a second layer consisting of $Si_3N_4$.

In fact, the cost of the target material Si is particularly low, and the oxidized ($SiO_2$) or nitrided ($Si_3N_4$) metals (or metalloids) of these interface layers have an excellent neutrality with respect to vanadium oxide.

The $Si_3N_4$ layer may be referred to as the buffer layer, while the $SiO_2$ layer may be referred to simply as the interface layer.

Advantageously, the first layer, consisting of $SiO_2$, has a thickness of 5 to 15 nm, for example 10 nm, and the second layer consisting of $Si_3N_4$, has a thickness of 100 to 140 nm, for example 120 nm.

Advantageously, the interface layers c) and e) are arranged symmetrically on either side of the dielectric layer made of $CeO_2$.

The infrared-active thermochromic material f) is n-doped vanadium IV oxide, $VO_2$, and crystallized.

The optical performances of the device according to the invention are produced by a conductive metal/semiconductive transition, more precisely by the transition between an electronically-conductive rutile phase of the doped and crystallized vanadium IV oxide, $VO_2$, and a monoclinic and electronically semiconductive phase of the doped and crystallized vanadium IV oxide, $VO_2$.

This transition occurs at a temperature referred to as the switching temperature Tc. When the doped and crystallized vanadium IV oxide, $VO_2$ is at a temperature below Tc, it is in the monoclinic semiconductive phase, and when the doped and crystallized vanadium IV oxide, $VO_2$ is at a temperature higher than Tc, it is then in the rutile metallic conductive phase.

For undoped $VO_2$ vanadium oxide, Tc is 68° C. It is described as switching at 68° C.

The vanadium IV oxide, $VO_2$, is n-doped.

In fact, an n-type doping of the vanadium IV oxide makes it possible to lower its switching temperature Tc to below 68° C.

The vanadium IV oxide, $VO_2$, may be n-doped with oxygen vacancies and/or by substitution of the $V^{4+}$ cations with $Z^{n+}$ metal cations having a valency n greater than 4.

The vanadium IV oxide, $VO_2$, may therefore be n-doped only by oxygen vacancies.

The vanadium oxide n-doped only with oxygen vacancies, which is therefore an oxygen sub-stoichiometric vanadium oxide, has the formula $VO_{2-x}$, where x is from 0 exclusive to 0.25 inclusive, preferably from 0.1 to 0.25.

The n-doping by oxygen vacancies may be performed by a precise control of the deposition conditions of an oxygen sub-stoichiometric vanadium IV oxide.

The vanadium IV oxide, $VO_2$, may be n-doped only by substitution of the $V^{4+}$ cations using $Z^{n+}$ metal cations having a valency n greater than 4.

The vanadium oxide that is n-doped only by substitution of the $V^{4+}$ cations with $Z^{n+}$ metal cations having a valency n greater than 4, corresponds to the formula $V_{1-y}Z_yO_2$, where y is from 0.01 to 0.03, for example 0.02, wherein:

y represents the metal cation doping rate expressed in atomic % of the $VO_2$ vanadium oxide. Thus, for example, if the doping rate is 2 atomic %, then y will be equal to 0.02, n is greater than 4, and may be, for example, 5 or 6, Z may be selected from Nb, Ta, Mo or W, preferably Z is W.

Preferably, the $Z^{n+}$ metal cations are $W^{6+}$ cations.

The yield of the substitution of $V^{4+}$ cations by $W^{6+}$ metal cations is −25° C. per % at. of W using the cathode sputtering technique.

In other words, whenever one in every 100 vanadium atoms is substituted by a tungsten atom, the switching temperature of the resultant solid solution $V_{1-y}W_yO_2$ is lowered by 25° C., Thus, if y is 0.01 (1% doping), then Tc is 68−25=43° C., and if y is 0.02 (2% doping), then Tc is 68−2×25=18° C. A Tc of 68° C. is the Tc of undoped $VO_2$.

For values of y greater than 0.03, the doping efficiency decreases because the solid solution is saturated, and defects appear such as clusters of $WO_z$ where z is between 1 and 2.

The vanadium IV oxide, $VO_2$, may be n-doped at the same time by oxygen vacancies and by substitution of the $V^{4+}$ cations using $Z^{n+}$ metal cations, having a valency n greater than 4.

The vanadium oxide n-doped both by oxygen vacancies and by substitution of the $V^{4+}$ cations with $Z^{n+}$ metal cations having a valency n greater than 4, corresponds to the formula $V_{1-y}Z_yO_{2-x}$ where x and y have already been defined above.

The doping with $Z^{n+}$ cations, for example with $W^{6+}$ cations, of undoped $VO_2$ or of $VO_{2-x}$ already doped with oxygen vacancies, is carried out by inserting ultrafine layers, namely of a thickness of 0.1 to 0.5 nm of metal Z, for example of metal tungsten between layers of undoped vanadium IV oxide $VO_2$ or between layers of $VO_{2-x}$ already doped with oxygen vacancies, and then by heating all these pairs of layers $VO_2/Z$ or $VO_{2-x}/Z$, for example at 500° C. (see step f) of the method) under an argon/oxygen atmosphere containing at least 96% argon, in order to crystallize the thermochromic material by annealing, for example at 500° C. (see step f) of the method), in order to produce the compound $V_{1-y}Z_yO_2$, or the compound $V_{1-y}Z_yO_{2-x}$, for example, $v_{0.98}W_{0.02}O_{2-x}$.

The solar protective coating, solar reflective coating, transparent in the infrared g) (over all the mid IR: from 2.5 to 25 μm with a peak of absorption at 9 μm), generally consists of a Bragg mirror.

Preferably, this Bragg mirror consists of an alternation of a layer of a metal oxide of high refractive index (n of 2 to 2.5, for example 2.2) and of a layer of a metal oxide of low refractive index (n of 1.3 to 1.8, for example 1.5).

The Bragg mirror may be a double center Bragg mirror, centered in the near-infrared range on 825 nm and in the visible range on 550 nm.

The device according to the invention comprises a specific stack of specific layers, of a specific thickness, in a specific order which has never been described in the prior art as represented, in particular, by the documents relating to the "solid state" thermochromic devices mentioned above.

In particular, the device according to the invention comprises a layer of a thermochromic material, active in the infrared, which is a layer made of a specific material, namely doped and crystallized $VO_2$ vanadium oxide, in a monoclinic or rutile phase. This thermochromic layer made of a specific material also has a specific thickness, namely a thickness of 30 to 50 nm, preferably 30 to 40 nm. This thermochromic layer may therefore be referred to as a very thin or very fine layer.

This thermochromic layer consisting of a specific thermochromic material, is disposed above an electronically insulating inorganic dielectric layer transparent to infrared radiation, and which is a layer made of a specific material, namely cerium oxide $CeO_2$. This inorganic dielectric layer also has a specific thickness, namely a thickness of 400 to 900 nm, preferably 700 nm to 900 nm. This dielectric layer may, therefore, be called a thick layer.

The solid state thermochromic device according to the invention is therefore particularly characterized in that it comprises the combination of a very thin layer of a specific thermochromic material on a layer of a specific dielectric material of high thickness.

The device according to the invention differs, in particular, from the device described in document US-A1-2014/0139904 cited above, in that $CeO_2$ is completely transparent in the infrared, which is not the case for the other oxides mentioned in document US-A1-2014/0139904. In addition, $CeO_2$ is a nontoxic oxide, while the most transparent compounds mentioned in this document are highly toxic fluorides or sulphides, the deposition of which involves significant chemical risks making the industrial manufacture of the devices very restrictive, if not impossible, because of the REACH standard.

The thermochromic layer of the device according to the invention is very thin and rests on a thick insulating layer of $CeO_2$, as well as on interface layers that are also insulating, on an IR reflective background.

As a result, when this thermochromic layer is heated above the switching temperature Tc, and is thus in its metallic state, it then possesses a residual IR transparency which makes it possible to obtain IR absorption or IR emissivity properties for the entire device.

The overall dielectric function over a high thickness, consisting of $CeO_2$ layers and interface layers, helps in trapping and then evacuating infrared radiation when T>Tc for the thermochromic layer in the metallic state. This phenomenon does not occur when T<Tc because the thermochromic layer is semiconductive having an insulating property. When T<Tc, the dielectric function becomes inactive with respect to the IR radiation coming from the wall, and the electronically-conductive metal background returns the heat towards the interior of the passenger compartment.

If this thermochromic layer were thicker, for example with a thickness greater than 100 nm, it would then be opaque to the infrared radiation and reflective of the infrared radiation above Tc, because of its metallic properties. The whole device would then be IR reflective and could not evacuate the heat.

When the device is heated to a temperature above Tc, it has a high IR emissivity.

It may be considered that the fundamental novel and inventive characteristic of the device according to the invention consists of the preparation and of the integration of a specific thermochromic material based on vanadium IV oxide ($VO_2$) in the form of a very thin layer, within a solid-state reflective device, which is switchable in the infrared (IR) and is of low solar absorptivity.

Thanks to the presence of a material that is transparent to infrareds IR consisting of cerium IV oxide in the form of a thick layer (400 to 900 nm) located behind the very thin layer of thermochromic material, the device becomes absorbent at high temperature, i.e. at a temperature above Tc, and produces a high emissivity to the outside of the wall provided with the device.

At low temperature, i.e. at a temperature below Tc, the device remains reflective and allows to retain the heat.

In other words, the novel and fundamental inventive characteristic of the device according to the invention consists of the integration of a thermochromic active material with infrared operation (IR, from 2.5 to 25 μm) on the front face of an IR opaque thermochromic device with variable reflectivity/emissivity and covered with a solar protection.

When subjected to a high temperature, the device becomes strongly absorbent in the mid infrared, from 2.5 to 25 μm, but not in the near infrared (from 0.78 to 1.1 μm (maximum absorption zone of the heat of the sun), thanks to the apposition of a solar protection coating, such as a Bragg mirror solar reflector.

The device according to the invention is therefore weakly absorbent in the solar domain (which comprises the near IR of 0.78 to 2.5 μm) and is highly emissive in the mid infrared range, which allows it, first, to reject a part of the heat coming from the sun from the outside (direct solar gains in the near infrared range), and to evacuate the heat stored by the internal elements (satellite electronics, objects in a room of a building or in the passenger compartment of an automobile) through infrared radiation (mid, from 2.5 to 25 μm) towards the outside of the wall equipped with the device.

According to the invention, the thermochromic material is a doped for example with tungsten and crystallized vanadium oxide, in a very thin layer (30 to 50 nm) that is deposited on a very thick cerium oxide dielectric layer (400 to 900 nm), which is necessary for the preparation of an IR filter. The doping by oxygen vacancies is performed through precise control of the deposition conditions of the substoichiometric vanadium IV oxide.

The device according to the invention may be defined as a solid state thermochromic device with modular reflection or emissivity in the infrared (IR), in particular in the mid infrared (wavelengths of 2.5 to 25 μm), whose active portion is a layer of thermochromic material that is active in the infrared and which, according to the invention, is located on the front face of the device.

The fact of having the active part of the thermochromic device, namely the thermochromic material layer that is active in the infrared, on the front face of the device, i.e. on the side of the device which is directly exposed to the sun's rays, is at the origin of many of the advantages of the device according to the invention.

It may be that the device according to the invention is made according to an optimized design which has never been described or suggested in the prior art relating to "solid state" thermochromic devices.

The thermochromic "solid-state" ("all-solid") device according to the invention is compatible with all the requirements governing a use in space, in fact the entirely inorganic materials that constitute it allow it to withstand UV attacks, vacuum, and high temperature, for example close to 100° C., unlike existing flexible devices whose electrolytic gels poorly support evacuation and whose polymers deform under the effect of heat and are not very resistant to UV.

The device according to the invention may be described as a robust, durable thermochromic device with a simplified design.

Moreover, the device according to the invention has the advantage of being able to be prepared very simply in a limited number of steps, using a same and single method of deposition for all the layers.

The device according to the invention may therefore be prepared within a reduced period and with reduced costs.

Thus, the device according to the invention (including the steps f) and g), see below) may be entirely and continuously carried out under vacuum by using a same and single physical vapor deposition technology (PVD) that is chosen, for example, from magnetron cathode sputtering, laser ablation, or evaporation, in a same and single deposition chamber and without opening the chamber before the device is obtained.

For technical and economic reasons, magnetron cathode sputtering in reactive mode is preferred because it allows control of the oxygen level in the plasma, high deposition rates, and ensures excellent optical quality of the thermochromic active material.

The invention also relates to a method for producing the device according to the invention, as described above, wherein the following successive steps are carried out:

a) deposition of an infrared-reflective layer of an electronically-conductive material on a solid substrate made of an inorganic material resistant up to a temperature of 550° C., especially up to a temperature of 540° C., for example up to a temperature of 500° C.;

b) deposition of electronically insulating interface layers on infrared-reflective layer deposited during step a);

c) deposition of an electronically insulating inorganic dielectric layer transparent to infrared radiation, made of cerium oxide $CeO_2$, having a thickness of 400 to 900 nm, preferably of 700 to 900 nm, on the interface layers deposited during step b);

d) deposition of electronically insulating interface layers on the electronically insulating dielectric layer transparent to infrared radiation made of cerium oxide $CeO_2$ deposited during step c);

e) deposition of a layer of an infrared-active thermochromic material, which is an undoped vanadium oxide $VO_2$, or a vanadium oxide doped with oxygen vacancies $VO_2$, in a monoclinic phase, on the interface layers deposited during step d), and ultrafine layers, namely with a thickness of 0.1 to 0.5 nm of a metal Z, for example of tungsten metal, are intercalated in the layer of undoped vanadium oxide $VO_2$, or optionally ultrafine layers, namely with a thickness of 0.1 to 0.5 nm of metal Z, for example of tungsten metal, are intercalated in the layer of vanadium oxide $VO_{2-x}$ doped with oxygen vacancies;

f) annealing of the substrate, and of the layers deposited during steps a) to e) at a temperature of more than 450° C. to less than 550° C. (i.e. at a temperature of 450° C. to 550° C., wherein the limit values of 450° C. and 550° C. are excluded), preferably of 460° C. to 540° C., more preferably of 500° C., in order to crystallize the thermochromic material;

g) deposition of a solar protective coating, solar reflective coating transparent in the infrared, on the layer of a thermochromic material.

The annealing temperature in step f) is more than 450° C., and less than 550° C., because at 450° C. the crystallization is not complete, while at 550° C., the substrate, for example of glass or of silicon, begins to degrade.

It may be noted that an annealing temperature of more than 450° C., and less than 550° C., for example 500° C., serves to make the grains of matter grow while diffusing the doping atoms, for example $W^{6+}$, in the crystallographic network of $VO_2$ (this is called a solid solution), but this temperature does not fix the freeze, crystallographic phase, which varies with the temperature of the ambient environment with respect to Tc.

In fact, for example, the thermochromic material is in its rutile phase at 22° C. for doping at 2% at. in W, because Tc=15° C., and the thermochromic material is in its monoclinic phase at 22° C. for doping at 1% at. in W, because then Tc=35° C.

The annealing, at a temperature of more than 450° C., and less than 550° C., for example at 500° C., of the whole of the substrate and of the stack of thin layers deposited during steps a) to e) is necessary in order to crystallize the thermochromic phase based on $VO_2$, cold semi-conductive (temperature less than Tc) and hot electronic conductive (temperature above Tc).

Advantageously, the annealing of the substrate and of the layers deposited during steps a) to e) is carried out under an atmosphere of argon and oxygen, containing at least 96% by volume of argon.

The method according to the invention is reliable and much simpler than the methods of the prior art such as those described in the documents cited above.

Advantageously, the layers and the solar protective coating are deposited by a physical vapor deposition method (PVD) selected from among magnetron cathode sputtering, laser ablation and evaporation.

Advantageously, all the layers and the solar protection coating g) are deposited under vacuum by a same physical vapor deposition method, preferably by magnetron cathode sputtering, for example by reactive magnetron cathode sputtering.

In fact, in the context of an industrialization, it is interesting to use the same deposition technique for all the layers of the stack (including the solar protection, such as a Bragg network), in order to avoid any risk of pollution of the interfaces.

For technical and economic reasons, and as already indicated, magnetron cathode sputtering in reactive mode is preferred because it ensures, in particular, good control of the oxygen level in the plasma, high deposition rates, for example about 60 nm/min, and good optical quality of the thermochromic active material.

Only $CeO_2$ is deposited in non-reactive mode from an oxide target.

In fact, the best performances for the layer of thermochromic material doped $VO_2$, for example with tungsten, are obtained by magnetron cathode sputtering.

All the thin layers of the stack are therefore advantageously deposited by the magnetron cathode sputtering technique, generally using a plasma-forming gas comprising argon.

In the case of the thermochromic material, the deposition of $VO_2$, optionally doped with oxygen vacancies, may be effected by reactive magnetron cathode sputtering from a vanadium target under an argon atmosphere, with a precise and controlled oxygen level in the deposition chamber.

Doping $VO_2$ for example with the aid of metallic tungsten, especially in the form of ultrafine layers of W incorporated in the $VO_2$ makes it possible to lower the active temperature range (Tc) by about 15° C.

Advantageously, all the steps including steps f) and g) are carried out, continuously, in the same vacuum chamber, without opening the chamber between each of the steps, which thus results in a significant simplification of the method, while saving significant time and reducing costs.

In fact, in order to fluidize the method and reduce the overall cost, it is advantageous to produce the device continuously, under vacuum, and without the need to open the machine.

The invention also relates to the use of the device as described above for the thermal protection of an object, in particular a satellite, a building or a passenger compartment of a vehicle (automobile, aircraft, train, vessel or other).

Other advantages of the invention will become apparent upon reading the detailed description which follows in connection with the accompanying drawings.

On the ordinate is the reflectivity, and on the abscissa is the wavelength (in μm).

Figure 3:
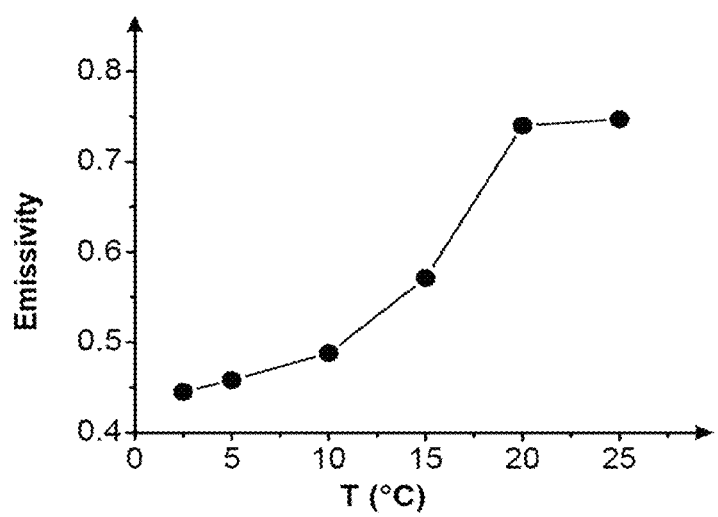

FIG. 3 is a graph which represents the variation of the emissivity produced by a device obtained at the end of step 5 of the example with a 2% tungsten doping, of active thickness 40 nm and with a surface area of 2.5×2.5 $cm^2$, integrated from 2.5 to 25 μm, as a function of the temperature, compared to the emissivity of a black body heated to the same temperature.

On the ordinate is the emissivity E, and on the abscissa is the temperature T (in ° C.).

It appears that Δε=0.3 with Tc=15° C. over a switching range of 5 to 25° C.

Figure 4A:
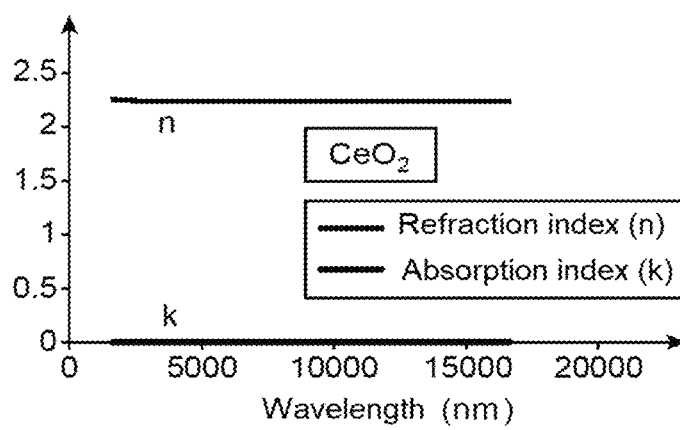
Figure 4B:
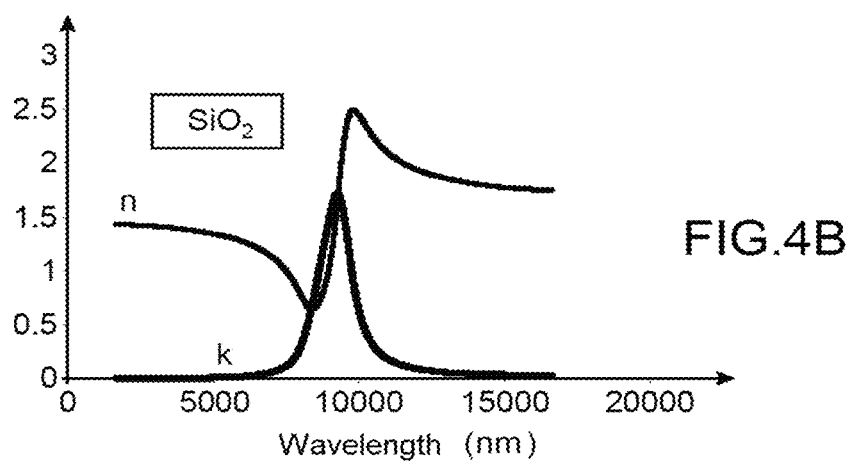

FIGS. 4A and 4B are graphs which show the optical indices (refractive index n and extinction coefficient k in the infrared of the constituents of the solar mirror prepared in step 6 of the example, namely of $CeO_2$ oxide (FIG. 4A) and of $SiO_2$ oxide (FIG. 4B), obtained from the reflection and transmission spectra of model layers of $CeO_2$ and $SiO_2$ with a thickness of 200 nm deposited on silicon.

On the ordinate are the optical indices n and k, and on the abscissa is the wavelength (in nm). It appears that the $CeO_2$ material is completely transparent to IR radiation from 2.5 to 16 μm (k=0). On the other hand, the $SiO_2$ material has an absorption peak at 9 μm (phonon band) that tarnishes its IR transparency.

Figure 5:
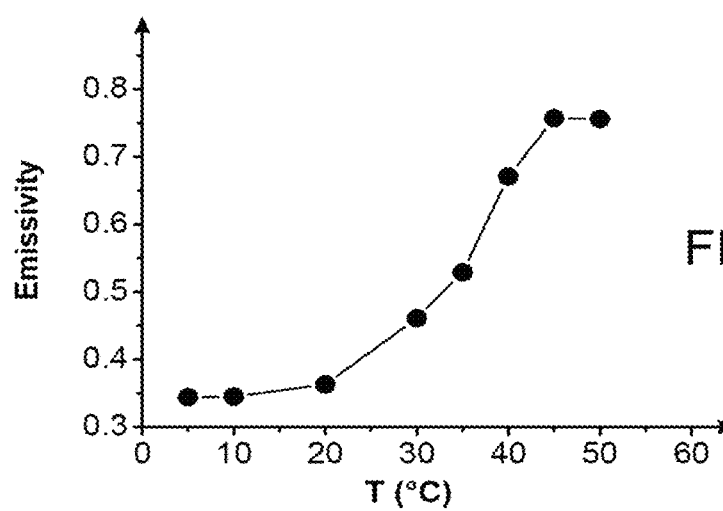

FIG. 5 is a graph which represents the variation of the emissivity produced by a device, obtained at the end of step 5 of the example with a 1% tungsten doping, of active thickness 50 nm and 5×5 $cm^2$ surface area, integrated from 2.5 to 25 μm, as a function of the temperature, compared to the emissivity of a black body heated to the same temperature. This device is not covered with solar protection.

On the ordinate is the emissivity, and on the abscissa is the temperature T (in ° C.). It appears that Δε=0.4 with Tc=35° C. over a switching range of 20 to 50° C.

Figure 6:
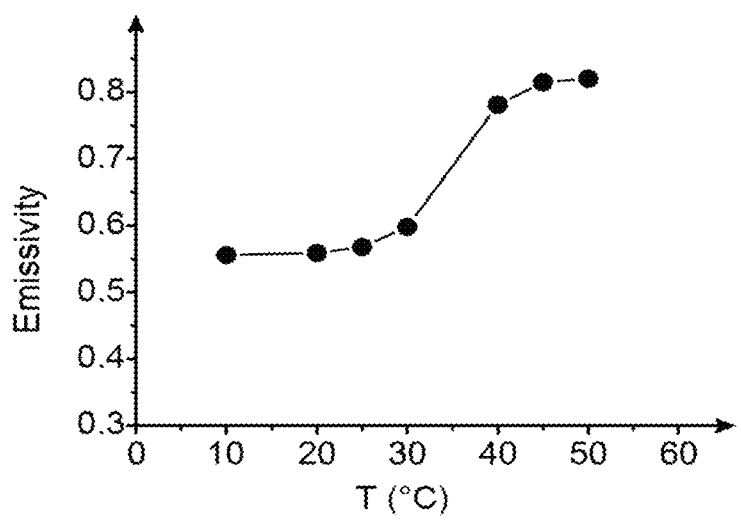

FIG. 6 is a graph which represents the variation of the emissivity produced by a device, which is obtained at the end of step 5 of the example with a 1% tungsten doping, of active thickness 50 nm and 5×5 $cm^2$ surface area, integrated from 2.5 to 25 μm, as a function of the temperature, compared to the emissivity of a black body heated to the same temperature. This device which is in accordance with the invention is furthermore covered with a solar protection prepared as in step 6.

On the ordinate is the emissivity, and on the abscissa is the temperature T (in ° C.). It appears that Δε=0.3 with Tc=35° C. over a switching range of 20 to 50° C.

Figure 7:
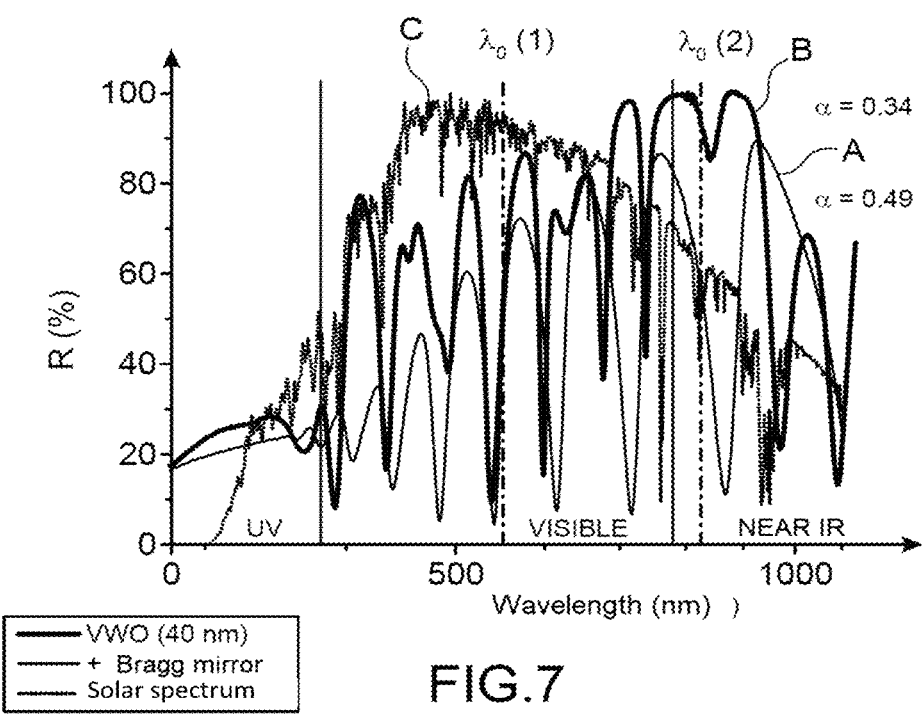

FIG. 7 is a graph which represents the variation of solar reflection R (this is the reflection coefficient R measured in the solar radiation range from 0.28 to 2.5 μm, here truncated to 1.1 μm) (in %) at 22° C., as a function of the wavelength (in nm) for:

a device, obtained at the end of step 5 of the example, comprising a layer with a thickness of 40 nm of thermochromic active material ($VO_2$ doped with 2% tungsten) (Curve A).

a device obtained at the end of step 5 of the example, comprising a layer of a thickness of 40 nm of thermochromic active material ($VO_2$ doped with tungsten) and covered, in addition, by a solar protection constituted by a double centering Bragg mirror [$\lambda_0$ (1)=550 nm and $\lambda_0$ (2)=825 nm] prepared as in step 6 of the example (Curve B).

FIG. 7 also shows the solar spectrum (Curve C).

It appears that the apposition of the sun protection reduces the solar absorption coefficient α from 0.49 to 0.34.

Figure 8:
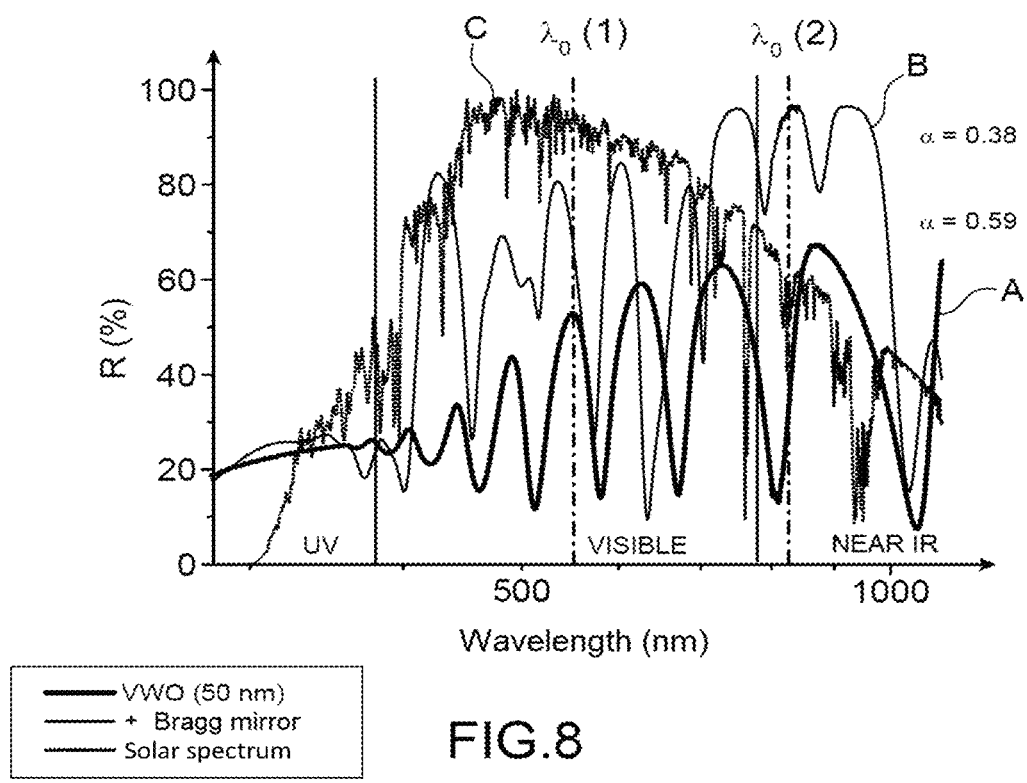

FIG. 8 shows a graph which represents the variation of the solar reflection R (R is the reflection coefficient measured in the solar radiation range from 0.28 to 2.5 µm, here truncated to 1.1 µm) (in %) at 22° C., as a function of the wavelength (in nm) for:

a device obtained at the end of step 5 of the example, comprising a layer with a thickness of 50 nm of thermochromic active material ($VO_2$ doped with 2% tungsten) (Curve A).

a device obtained at the end of step 5 of the example, comprising a layer with a thickness of 50 nm of thermochromic active material ($VO_2$ doped with 2% of tungsten) and covered, in addition, with a solar protection consisting of a double centering Bragg mirror [$\lambda_0$ (1)=550 nm and $\lambda_0$ (2)=825 nm] prepared as in step 6 of the example (Curve B).

FIG. 8 also shows the solar spectrum (Curve C).

It appears that the apposition of the sun protection reduces the solar absorption coefficient α from 0.59 to 0.38.

DETAILED DESCRIPTION OF SPECIFIC EMBODIMENTS

Figure 1:
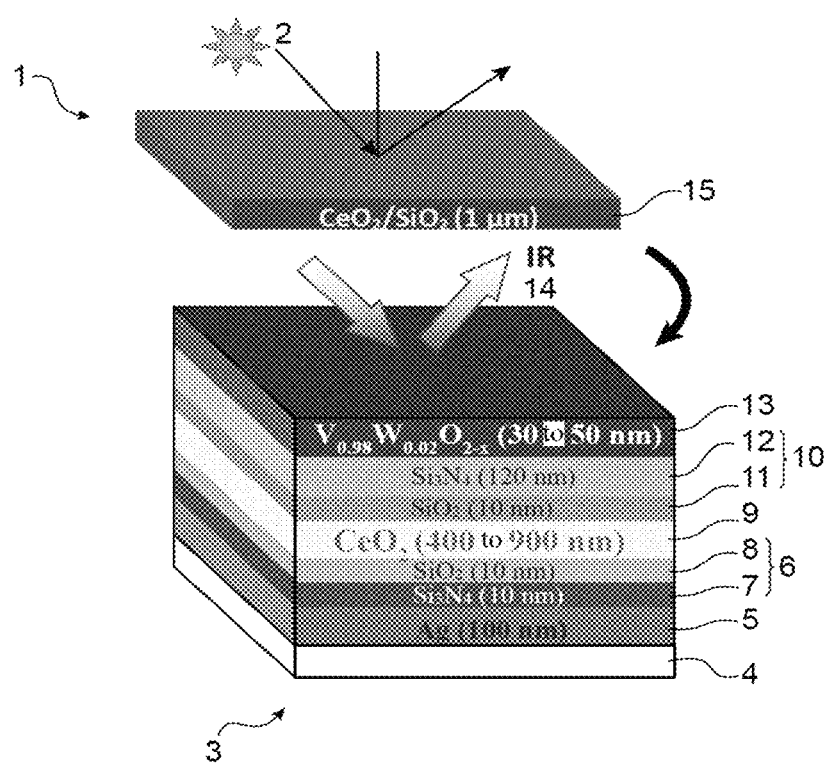
FIG. 1 shows a schematic view of the device according to the invention.

FIG. 1 shows a solid state thermochromic device active in the infrared according to the invention, which comprises a stack of inorganic layers with a layer made of a thermochromic material based on vanadium IV oxide, with doped $VO_2$.

It should be noted that the indications shown in FIG. 1, in particular with regard to the material constituting each of the layers, and the protective coating, are only given as examples, illustrations, and in no way need to be considered as constituting any limitation.

This device comprises a front face (1) directly exposed to solar radiation (2), and a rear face (3) bonded to the wall (or glazing) which conducts the heat towards the front face in order to re-emit it towards the side of the satellite (or building or vehicle) by infrared emissivity when the temperature T of the device (and therefore, in particular, the temperature of the thermochromic material whose temperature T is greater than Tc. In fact it may be considered that T wall=T device=T thermochromic material because the device consists of a stack of thin layers) is greater than Tc in hot phase, or which retains the heat inside the satellite (or building or vehicle) when the temperature T of the device is lower than Tc in the cold phase, with a low emissivity (without sunshine in the case of a satellite or with a winter sun in the case of a building or a passenger compartment of a vehicle such as an automobile).

The device according to the invention firstly comprises a substrate or support (4) that essentially plays the role of mechanical support of the device.

The substrate or support (4) generally does not have transparency to infrared radiations.

The solid substrate or support (4) is made of an inorganic material that is resistant up to a temperature of 550° C., especially up to a temperature of 540° C., for example up to a temperature of 500° C. in particular in an argon and oxygen atmosphere containing at least 96% by volume of argon.

The term "inorganic material resistant up to a temperature of 550° C., in particular up to a temperature of 540° C., for example up to a temperature of 500° C.", is generally understood to mean that this material is not mechanically, physically or chemically degraded when exposed to such a temperature.

Materials that are particularly suitable as a material of the solid substrate are aluminum, silicon, and borosilicate glasses.

Advantageously, the substrate (4) is in the form of a layer, or sheet, preferably a layer or sheet having a thickness of 0.3 to 1 mm, for example a thickness of 0.5 mm. It may be, for example, a silicon substrate having a thickness of 0.5 mm, whose face that is intended to receive the subsequent layers, is polished.

On the substrate or support (4) is disposed a reflective layer (5), also referred to as a reflective background. This layer is made of an electronically-conductive material.

Preferably, this electronically-conductive material is selected from metals, metal alloys, and electronically-conductive metal oxides, such as tin-doped indium oxide (ITO), fluorine-doped tin oxide (FTO), antimony-doped tin oxide (ATO), and aluminum-doped zinc oxide (AZO), more preferably the reflective layer is silver.

The reflective layer generally has between 60% and 100% reflectivity in the mid infrared, preferably 100%.

The reflective layer (5) generally has a thickness of 80 to 150 nm, preferably 100 nm.

The metals that may constitute the reflective layer (5) may be chosen, for example, from noble metals such as gold, silver or platinum; aluminum, chromium, and their alloys.

A preferred metal is silver, and in this case the thickness of the reflective layer (5) is preferably 100 nm.

Electronically-conductive metal oxides are well known to the man skilled in the art.

Examples of such conductive oxides are tin-doped indium oxide (ITO), fluorine-doped tin oxide (FTO), antimony-doped tin oxide (ATO), or aluminum-doped zinc oxide (AZO), that should preferably be combined with aluminum-based interface layers to avoid the formation of the vacant (lacunar) compound □ (vacant sites of the spinel structure) $AlSiO_4$. It is the same with a reflective aluminum background.

The electronically-conductive material of the reflective layer (5), especially when it is an electronically-conductive metal oxide, is generally chosen from materials that may be deposited in a thin layer by a PVD process, such as cathode sputtering, laser ablation or evaporation, and preferably among the materials that may be deposited in a thin layer by cathode sputtering.

In FIG. 1, the reflective layer (5) is a silver layer with a thickness of 100 nm.

Interface layers (6) are arranged on the reflective layer (5).

These interface layers (6) make it possible to ensure the adhesion of the dielectric layer (9) on the reflective layer (5).

The interface layers may, preferably, should be 2 in number.

The nature of these interface layers is so chosen in order to ensure the best adhesion of the dielectric layer (9) on the reflective layer (5).

Thus, in FIG. 1, the device comprises a nitrided first layer (7) to passivate silver, and a second oxidized layer (8) to bond the cerium oxide.

The interface layers (6) may have a total thickness of 10 to 30 nm, while each layer may have a thickness of 5 to 15 nm.

Generally both layers have the same thickness.

The materials of the interface layers (6) are chosen in order to ensure the best adhesion of the dielectric layer (9) on the reflective layer (5).

The materials of the interface layers (6) are also generally chosen from materials that may be deposited in a thin layer by a PVD process, such as cathode sputtering, laser ablation or evaporation, and preferably from the materials that may be deposited in a thin layer by cathode sputtering.

Suitable materials are for example $SiO_2$ and $Si_3N_4$, and the interface layers may then comprise an $Si_3N_4$ layer (7), and an $SiO_2$ layer (8).

In the embodiment shown in FIG. 1, the interface layers (6) comprise, starting from the reflective layer, a first layer consisting of $Si_3N_4$ or AlN (7), then a second layer consisting of $SiO_2$ or $Al_2O_3$ (8).

The nitrided layer protects silver against oxygen introduced during the deposition of $CeO_2$, and the oxidized layer, bonded to the nitrided layer by Si—Si or Al—Al bonds, creates O—O bridges between it and the layer of $CeO_2$.

The first layer consisting of $Si_3N_4$ (7) may have a thickness of 5 to 15 nm, for example 10 nm, and the second layer consisting of $SiO_2$ (8) may have a thickness of 5 to 15 nm, for example 10 nm.

In FIG. 1, the first layer consisting of $Si_3N_4$ (7) has a thickness of 10 nm, and the second layer consisting of $SiO_2$ (8) has a thickness of 10 nm.

On the interface layers (6), or rather on the interface layer (8) that is deposited last on the reflective layer, which is, for example, in the embodiment shown in FIG. 1, a layer of $SiO_2$ of a thickness of 10 nm, is disposed an electronically insulating dielectric layer and transparent to infrared radiation (9) over a wavelength range of 2.5 to 25 µm (mid IR).

This electronically insulating dielectric layer and transparent to infrared radiation has a thickness of 400 to 900 nm, preferably 700 to 900 nm.

This electronic insulating dielectric layer and transparent to infrared radiation (9) is made of cerium oxide $CeO_2$.

On the electronically insulating dielectric layer and transparent to the infrared radiation (9) are arranged interface layers (10).

These interface layers (10) make it possible to ensure the adhesion and the integrity of the thermochromic layer (13) deposited on the electronically insulating dielectric layer and transparent to the infrared radiation (9), by preventing the formation of the $CeVO_4$ compound with IR absorption between 9 and 13 µm.

The interface layers (10) must be 2 in number and are generally silicon-based, non-reactive with $CeO_2$ and with $VO_2$.

Thus, in FIG. 1, the device comprises two interface layers (11, 12).

After bonding the first layer of $SiO_2$ (11) with $CeO_2$ via O—O bridges, the second layer of $Si_3N_4$ (12), referred to as the buffer layer, which is much thicker and adheres to $SiO_2$ with the aid of Si—Si bonds, prevents any reactivity of $VO_2$ with $CeO_2$.

The nature of the interface layers (10) is chosen in order to ensure the best adhesion and the best integrity of the thermochromic layer (13) on the electronically insulating dielectric layer transparent to infrared radiation (9).

The interface layers (10) may have a total thickness of 105 to 155 nm. Two consecutive interface layers are generally of different materials.

The materials of the interface layers (10) are also selected to ensure the best adhesion and integrity of the thermochromic layer (13) on the electronically insulating dielectric layer transparent to infrared radiation (9).

The materials of the interface layers (10) are also generally selected from materials that may be deposited in a thin layer by a PVD method, such as cathode sputtering, laser ablation or evaporation, and preferably from among materials that may be deposited in a thin layer by cathode sputtering.

In the embodiment shown in FIG. 1, the interface layers (10) comprise, from the electronic insulating dielectric layer transparent to infrared radiation (9), a first layer consisting of $SiO_2$ (11) and then a second buffer layer consisting of $Si_3N_4$ (12).

The first layer consisting of $SiO_2$ (11) may have a thickness of 5 to 15 nm, for example 10 nm, and the second layer consisting of $Si_3N_4$ (12) may have a thickness of 100 to 140 nm, for example 120 nm.

In FIG. 1, the first layer, consisting of $SiO_2$ (11) has a thickness of 10 nm, and the second layer consisting of $Si_3N_4$ layer (12) has a thickness of 120 nm.

FIG. 1 shows an advantageous embodiment in which the layers (11), (12) and (7), (8) are arranged symmetrically on either side of the layer (9), wherein the $SiO_2$ layers are disposed in contact with each of the faces of the layer (9).

On the interface layers (10), or rather on the interface layer (12) deposited last on the reflective layer, which is, for example, in the embodiment shown in FIG. 1, a buffer layer of $Si_3N_4$ (12) having a thickness of 120 nm, is disposed a layer (13) of a thermochromic material that is active in the infrared and that is a doped and crystallized vanadium oxide $VO_2$, in a monoclinic or rutile phase, with a thickness of 30 to 50 nm, preferably 30 to 40 nm.

Because of its very small thickness, this layer (13) of a thermochromic material may be described as very thin layer. This very small thickness of the layer of thermochromic material is one of the essential characteristics of the device according to the invention.

The vanadium oxide may be deposited in a very thin, very fine layer by a PVD process such as cathode sputtering, laser ablation or evaporation, and preferably by sputtering.

In FIG. 1, the layer of thermochromic material (13) is a layer of $V_{0.98}W_{0.02}O_{2-x}$ with a thickness of 30 to 50 nm.

On the layer of a thermochromic material that is active in the infrared and is a crystallized and doped vanadium oxide $VO_2$ (13), is arranged a solar protective coating (15) reflecting the solar radiation (2) and transparent to infrared rays (14) (over all mid IR, from 2.5 to 25 µm with an absorption peak at 9 µm).

The term "transparent to infrared radiation" is generally understood to mean that this coating (15) is transparent to infrared rays of wavelengths between 2.5 µm and 25 µm, preferably between 2.5 µm and 16 µm.

This coating (15) is generally made of a non-toxic inorganic material.

Preferably, this coating (15) is made of a material selected from metal and metalloid oxides, and mixtures of two or more of these metal oxides and metalloid oxides.

This, or these, oxide(s) of metals or metalloids, preferably amorphous, is/are preferably chosen from oxides which may be easily deposited by PVD, in particular by magnetron cathode sputtering, from an oxide or metal target, such as cerium oxide $CeO_2$, yttrium oxide $Y_2O_3$, or $SiO_2$.

The coating (15) generally has a thickness of 0.5 to 1.25 µm, preferably 1 µm to 1.25 µm, more preferably 1.25 µm.

This coating (15) is generally constituted by a Bragg mirror.

Preferably, this Bragg mirror comprises an alternation of a layer of a metal oxide of high refractive index (n of 2 to 2.5, for example 2.2) such as $CeO_2$, and of a layer of a metal oxide of low refractive index (n of 1.3 to 1.8, for example 1.5), such as $SiO_2$.

In FIG. 1, the coating (15) comprises alternating $CeO_2$ layers and $SiO_2$ layers and may have a total thickness of from 0.5 to 1.25 µm, preferably from 1 µm to 1.25 µm, more preferably 1.25 µm. However, by way of example, it is indicated in FIG. 1 that the coating (15) represented in this figure has a thickness of 1 µm. It is composed of 3 pairs of $CeO_2$ and $SiO_2$ layers centered on 550 nm of respective 55 and 95 nm thicknesses, then of 3 pairs of $CeO_2$ and $SiO_2$ layers centered on 825 nm of respective 80 and 150 nm thicknesses, and of a terminal layer of $CeO_2$ of 80 nm.

The operation of the device of FIG. 1, when used, for example, to equip a satellite, may be described in the following manner.

In the solar exposure phase, the satellite's internal electronics need to be protected from the high temperature, which can reach 100° C. at the wall. First, the Bragg mirror located on the front face of the device makes it possible to reject solar radiation by reflection to more than 70%, over the range of 0.28 to 2.5 µm.

This results in a decrease in the solar absorptivity of devices comprising 40 and 50 nm of 2% doped IR active thermochromic material whose a coefficients decrease respectively from 0.49 to 0.34 (FIG. 7) and from 0.59 to 0.36 (FIG. 8) after apposition of the solar protection.

On the other hand, the IR active thermochromic material composed of $VO_2$ doped with 2 atomic % tungsten (y=0.02) has a metallic character (rutile phase) obtained at T>Tc with Tc=15° C. (FIG. 3). Its high emissivity at high temperature ($\varepsilon_{HT}$=0.75) will thus produce an evacuation of the heat stored inside the satellite by infrared radiation towards the outside, over the range of 2.5 to 25 µm.

The solar protection located in the front face therefore needs therefore to be transparent throughout the entire infrared range. It is the same when the device of FIG. 1 is used for glazing for buildings or automobiles. When the doping rate of the thermochromic material decreases (y=0.01), Tc rises to 35° C. (FIG. 5), and the apposition of the Bragg mirror has the effect of increasing the value of $\varepsilon_{HT}$ to 0.85. However, this improvement of $\varepsilon_{HT}$ is effected to the detriment of the low value of the $\varepsilon_{BT}$ emissivity which rises from 0.35 to 0.55. In the absence of solar radiation, the conservation of heat inside the satellite will then be less effective. There is therefore a compromise between the best rejection of solar gains (obtained with the highest thickness of the Bragg mirror, i.e. 1.25 µm), and the best energy efficiency at low temperature (obtained without solar protection with the lowest doping rate, i.e. y=0.01).

The device according to the invention is prepared by the method described above.

The apparatus used to implement the method according to the invention for preparing the device according to the invention may be, for example, a physical vapor deposition (PVD) frame comprising:

- a vacuum chamber of a volume of, for example, 0.1 m³ in which an initial pressure prevails, for example of approximately 5 $10^{-7}$ mbar, wherein the maximum pumping speed for producing the vacuum in the chamber is 900 L/s with a chamber initially filled with nitrogen;
- at most 6 cathodes with a diameter of 3 inches (or 76 mm), or 2 cathodes with a diameter of 6 inches (or 152 mm) and 2 cathodes with a diameter of 3 inches (or 76 mm);
- each deposit is produced by magnetron cathode sputtering from a metal or metal oxide target, for example made of Ag, Si, $CeO_2$, V, or W, in radio frequency RF mode, with an applied power of 1 to 10 W/cm² of the target, or in DC mode, with an applied power of 0.6 to 2 W/cm², in order to obtain slow or high deposition rates as a function of the material to be deposited and the fragility of the target, for example of 3 to 120 nm/minute for $CeO_2$ and Ag respectively.

Such deposition conditions allow industrialization of the process, described as reactive, for the manufacture of thin-layer oxides from metal targets, except for $CeO_2$ whose target is an oxidized ceramic of the same composition (fragile target).

The plasma-forming gas atmosphere in which the deposit is produced is chosen as a function of the material which constitutes the deposited layer.

Thus, this atmosphere may consist of:

- argon, with a pressure of, for example, 9 $10^{-3}$ mbar, for depositing a reflective layer made of metal, for example made of silver;
- a mixture of argon and nitrogen, for example in the proportions of 70 to 75% and 25 to 30% by volume respectively, with a total pressure of 2.1 to 2.3 $10^{-2}$ mbar, for example of 2.2 $10^{-2}$ mbar, for the deposition of an interface layer made of $Si_3N_4$;
- a mixture of argon and oxygen, for example in the proportions of 83 to 96% and 4 to 17% by volume respectively, with a total pressure of 1.7 to 3.3, for example 3.2 $10^{-2}$ mbar or 1.2 $10^{-2}$ mbar, or 1.75 $10^{-2}$ mbar for the deposition of an interface layer, or of a layer of the $SiO_2$ solar protection coating, for the deposition of a dielectric layer or of a layer of the $CeO_2$ solar protection coating, or for the deposition of a $VO_2$ thermochromic layer that is active in the infrared.

The annealing of the stack obtained at the end of step e) is carried out in the same vacuum chamber where the deposits are made.

Generally, this annealing is carried out under the same conditions (in an atmosphere similar to that used for the deposition of $VO_2$) as the conditions in which the deposition of $VO_2$ was carried out, namely under the same partial pressure of argon/oxygen at 500° C. for at least 1 hour.

The device according to the invention that is inorganic, robust and with a simplified design for industrialization, and which may, in particular, operate in the mid infrared, finds in particular its application in the thermal protection of satellites.

For example, it is possible to use "tiles" ("patches") for satellites composed of several "solid state" thermochromic devices according to the invention to replace high energy-consuming mechanical shutters.

The invention will now be described with reference to the following example, given by way of nonlimiting illustration, which describes the manufacture of a thermochromic device according to the invention, such as that represented in FIG. 1, by the method according to the invention, implementing the magnetron cathode sputtering technique to prepare all the layers.

EXAMPLE

All the layers of the device according to the invention, and prepared by the device according to the invention, are prepared by implementing the same technique, namely the magnetron cathode sputtering technique, in the same magnetron sputtering chamber under vacuum (namely, at a residual pressure lower than $10^{-6}$ mbar (high vacumm, secondary vacuum) before introduction of the plasma-forming gases that are used during the deposition phases of the materials in thin layers which are carried out under primary vacuum (rough vacuum)), under a pressure of argon, or of a mixture of argon and nitrogen, or of a mixture of argon and oxygen in reactive mode, while maintaining the vacuum between the deposition of two successive layers and without opening the chamber before the last layer of the device is deposited.

A different target must however be used for the deposition of each layer containing a different metal. Thus, the interface layers use the same target (Si), while the solar protection layer (or Bragg mirror) also uses this same target (Si), as well as the target used for the dielectric layer ($CeO_2$). Five targets are therefore necessary to produce the device according to the invention by the method according to the invention, i.e. the magnetron cathode sputtering technique, namely:

- a silver target for producing the reflective background,
- a silicon target for producing the interface layers and the low refractive index layer of the Bragg mirror,
- a cerium oxide target for producing the dielectric layer and the high refractive index layer of the Bragg mirror,
- a vanadium target for producing the thermochromic material,
- a tungsten target for doping the thermochromic material.

1. Preparation of the Reflective Background on the Substrate.

The metal layer which acts as a reflective background is a layer of silver with a thickness of 100 nm deposited by magnetron cathode sputtering.

This silver layer is deposited on the polished side of a silicon substrate with a thickness of 0.5 mm, and a surface of $2.5 \times 2.5$ cm$^2$ or $5 \times 5$ cm$^2$.

The deposition power is 90 W in DC mode (V=380V, I=0.24A), while the diameter of the silver target is 75 mm.

The argon pressure in the chamber is $10^{-3}$ mbar, while the target-substrate distance is 8 cm.

The duration of the deposit is 50 s.

Figure 2:
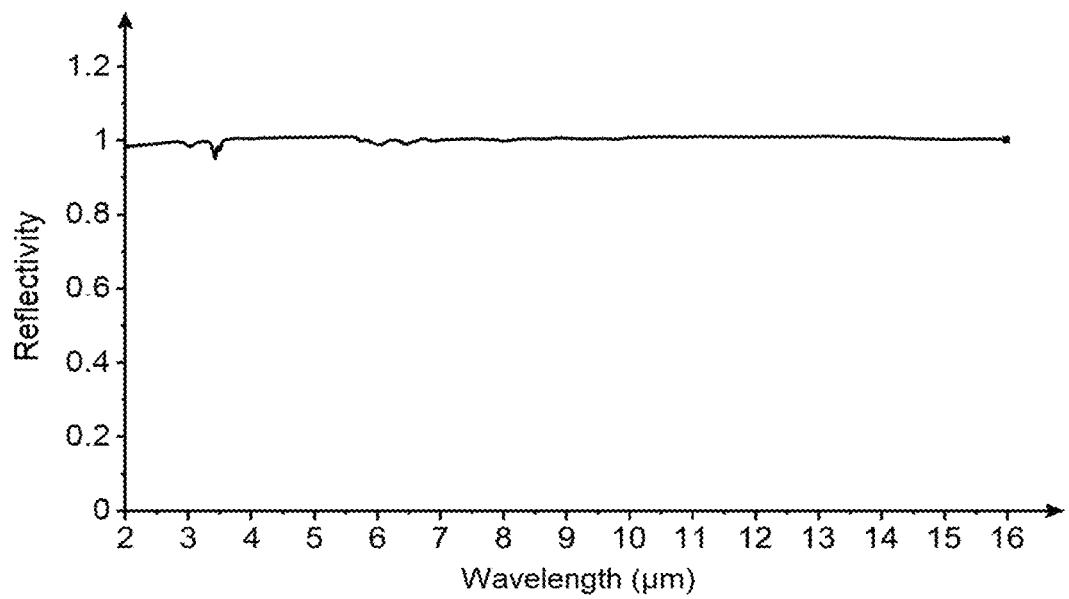
FIG. 2 shows a graph showing the infrared reflectivity of the reflective metal background of the device according to the invention, prepared in step 1 of the example.

This silver layer has 100% reflectivity in the infrared as shown in FIG. 2 which represents the infrared reflectivity of the metal (background) base of the device according to the invention, and is prepared by the method according to the invention.

2. Elaboration of the Interface Layers Between the Reflective Background (Base) and the Main Dielectric Layer to Ensure the Adhesion of the Main Dielectric Layer on the Reflective Background (Base).

The first interface layer is composed of $Si_3N_4$ and has a thickness of 10 nm.

It is deposited on the silver layer which acts as a reflective background by reactive magnetron cathode sputtering in RF radio frequency mode, with a power of 250 W applied to a silicon target 75 mm in diameter, under an argon and nitrogen atmosphere, respectively injected at 60 and 20 sccm, wherein the total pressure in the chamber is $2.2 \ 10^{-2}$ mbar.

The deposition period is 60 s.

The second interface layer is composed of $SiO_2$ and has a thickness of 10 nm.

It is deposited on the first interface layer, composed of $Si_3N_4$, by radiofrequency RF reactive magnetron cathode sputtering, with a power of 250 W applied to a silicon target 75 mm in diameter, under an argon and oxygen atmosphere injected respectively at 100 and 20 sccm, wherein the total pressure in the chamber is $3.2 \ 10^{-2}$ mbar.

The deposition time is 60 s.

3. Preparation of the Main Dielectric Layer.

This layer is composed of $CeO_2$ and has a thickness of 400 nm.

It is deposited on the second interface layer, composed of $SiO_2$, by radiofrequency RF reactive magnetron cathode sputtering, with a power of 250 W applied to a $CeO_2$ target of 175 mm in diameter, under an argon and oxygen atmosphere injected respectively at 40 and 3 sccm, wherein the total pressure in the chamber is $1.2 \ 10^{-2}$ mbar.

The deposition time is 120 min.

4. Preparation of the Interface Layers Between the Main Dielectric Layer and the Thermochromic Layer.

The first interface layer between the main dielectric layer and the thermochromic layer is composed of $SiO_2$ and has a thickness of 10 nm.

It is deposited on the main dielectric layer, composed of $CeO_2$, by reactive magnetron cathode sputtering in RF radio frequency mode, with a power of 250 W applied to a silicon target 75 mm in diameter, under an argon and oxygen atmosphere injected respectively at 100 and 20 sccm, wherein the total pressure in the chamber is $3.2 \ 10^{-2}$ mbar.

The deposition time is 60 s.

The second interface layer between the main dielectric layer and the thermochromic layer is composed of $Si_3N_4$ and has a thickness of 120 nm in order to prevent any reactivity between the $CeO_2$ and $VO_2$ materials and to thus act as a buffer layer.

It is deposited on the first interface layer between the main dielectric layer and the thermochromic layer, composed of $SiO_2$, by reactive magnetron cathode sputtering in radio frequency RF mode, with a power of 250 W applied to a silicon target of 75 mm diameter, under an atmosphere of argon and nitrogen respectively injected at 60 and 20 sccm, wherein the total pressure in the chamber is $2.2 \ 10^{-2}$ mbar.

The deposition time is 12 minutes.

5. Preparation of the Active Thermochromic Layer in the Infrared.

This layer is mainly composed of $VO_2$ and has a thickness of 40 to 50 nm.

It is deposited on the second interface layer between the main dielectric layer and the thermochromic layer, composed of $Si_3N_4$, by reactive magnetron cathode sputtering in radio frequency RF mode, with a power of 450 W applied to a silicon target of 75 mm diameter, under an atmosphere of argon and oxygen respectively injected at 60 and 2.6 sccm, wherein the total pressure in the chamber is $1.75 \ 10^{-2}$ mbar.

The total duration of the deposition is from 45 s for a layer of 40 nm, to 60 s for a layer of 50 nm.

This layer is doped with 3 or 4 ultrafine layers of tungsten metal deposited by magnetron sputtering in pulsed DC mode (50 kHz, 2 µs), with a power of 100 W applied to a target of tungsten of diameter 150 mm.

The tungsten layers are intercalated in the $VO_2$ layer, by performing, during the deposition of the $VO_2$ layer, every 15 s, a sweep in front of the tungsten target with a substrate rotation speed of 15 rpm under 20 sccm of argon.

More precisely, every 15 seconds the deposition of $VO_2$ is stopped, and the sample is passed very rapidly in front of the target of W to deposit an ultrafine layer of W of a few tenths of a nanometer.

The whole of the stack obtained at the end of this step of preparing the thermochromic layer active in the infrared is then annealed at 500° C. under the same partial pressure of argon/oxygen as that used for the $VO_2$ deposition, i.e. at about $2.9 \ 10^{-2}$ mbar for 1 h.

The stack subjected to annealing thus comprises, successively, starting from the substrate, the silver reflective background, the interface layers making it possible to ensure the adhesion of the dielectric layer to the reflective background, the main dielectric layer, the interface layers between the main dielectric layer and the thermochromic layer, and finally the thermochromic layer active in the infrared.

It should be noted that the solar protection is not annealed. It is deposited after annealing, otherwise the $CeO_2$ it contains would react with $VO_2$.

The thermochromic behavior in the infrared of a device prepared as described above, comprising a layer with a thickness of 40 nm of thermochromic active material, and whose surface is 2.5×2.5 cm², is presented in FIG. 3.

More precisely, FIG. 3 shows the variation of the emissivity produced by a device of active thickness 40 nm and surface area 2.5×2.5 cm², integrated from 2.5 to 25 μm, as a function of the temperature, relative to the emissivity of a black body brought to the same temperature.

The hysteresis of heating/cooling between the state of lowest emissivity and the state of highest emissivity is almost zero ($\Delta\varepsilon=0.3$ where $\varepsilon_{BT}=0.45$ and $\varepsilon_{HT}=0.75$) ($\varepsilon_{BT}$ and $\varepsilon_{HT}$ represent the lowest emissivity and the highest emissivity), while the switching temperature is 15° C. over a range of 2.5 to 25° C.

6. Preparation of the Solar Protection or Bragg Mirror.

The same magnetron cathode sputtering deposition technique as that used in steps 1 to 5 described above is also used to achieve a solar protection, i.e. a Bragg mirror or solar mirror, reflector on glass at 78%, on the stack obtained at the end of steps 1 to 5 described above.

More precisely, this solar protection, Bragg mirror, or solar mirror is deposited on the layer of thermochromic material which is, starting from the substrate, the last layer of the stack obtained at the end of steps 1 to 5 described above.

This solar protection, Bragg mirror, or solar mirror comprises alternating layers of $CeO_2$ (n=2.5) and $SiO_2$ (n=1.48) with high and low refractive indices measured at 550 and 825 nm, and mean values respectively equal to 2.2 and 1.5 in the range of 0.28 to 2.5 μm.

A first set of 3 pairs of $CeO_2$ (thickness 55 nm)/$SiO_2$ (thickness 95 nm) layers, centered in the visible range, on 550 nm, is first deposited on the thermochromic layer that is active in the infrared.

On this first set of 3 pairs of layers, is then deposited a second set of 3 pairs of $CeO_2$ (80 nm thickness)/$SiO_2$ (150 nm thickness) layers centered in the near-infrared range on 825 nm.

Then a terminal layer of $CeO_2$ with a thickness of 80 nm is deposited on this second set of three pairs of layers.

The same deposition conditions are used for the $CeO_2$ and $SiO_2$ deposits of the solar mirror, for the $CeO_2$ dielectric layer, and for the silica interface layers respectively.

The deposition durations (times) have been adapted according to the deposition rates of each material, namely:

For the first set of three pairs of layers, centered at 550 nm, the $CeO_2$ deposition rate is 3.3 nm/min, and the $CeO_2$ deposition time is 17 minutes, and the $SiO_2$ deposition rate is 10 nm/min, and the $SiO_2$ deposition time is 9.5 minutes.

For the second set of three pairs of layers, centered at 825 nm: the $CeO_2$ deposition rate is 3.3 nm/min, and the $CeO_2$ deposition time is 24 minutes, and the deposition rate of $SiO_2$ is 10 nm/min, and the $SiO_2$ deposition time is 15 minutes.

Finally, the terminal layer of $CeO_2$ is deposited in 24 min.

FIGS. 4A and 4B show the optical indices (refractive index n and absorption index k) in the infrared of the constituents of the solar mirror, namely $CeO_2$ oxide (FIG. 4A) and $SiO_2$ oxide (FIG. 4B) as obtained from the reflection and transmission spectra of the model layers of $CeO_2$ and $SiO_2$ with a thickness of 200 nm deposited on silicon.

It appears from FIGS. 4A and 4B that the choice of the $CeO_2$ layer is motivated by its high transparency in the infrared (k=0), in order to alter as little as possible the emissivity variation of the device once covered with solar protection. In addition, this layer provides good protection with respect to the active material.

The $SiO_2$ layer however has a phonons band centered on 9 μm, responsible for an additional average absorption that displaces the low values of emissivity upwards.

The thermochromic behavior in the infrared, of a device prepared as described above (steps 1 to 5), comprising a layer with a thickness of 50 nm of thermochromic active material doped at 1%, and the surface area of which is 2.5×2.5 cm², is shown in FIG. 5. This device is not covered with a solar protection.

More precisely, FIG. 5 represents the variation of the emissivity produced by a device of active thickness 50 nm and surface area 5×5 cm², integrated from 2.5 to 25 μm, as a function of the temperature, with respect to the emissivity of a black body brought to the same temperature. This device is not covered with a solar protection.

The thermochromic behavior in the infrared, of a device prepared as described above (steps 1 to 5), comprising a layer with a thickness of 50 nm of thermochromic active material doped at 1%, and the surface area of which is 2.5×2.5 cm², is shown in FIG. 6. This device is covered with a solar protection prepared as in step 6.

More precisely, FIG. 6 represents the variation of the emissivity produced by a device of active thickness 50 nm and of surface area 5×5 cm², integrated from 2.5 to 25 μm, as a function of the temperature, with respect to the emissivity of a black body brought to the same temperature. This device is covered with a solar protection.

FIGS. 5 and 6 show that, for a device comprising 50 nm of active material doped at 1%, the infrared optical contrast $\Delta\varepsilon$ decreases from 0.4 ($\varepsilon_{BT}=0.35$ and $\varepsilon_{HT}=0.75$) to 0.3 after affixing of the solar protection ($\varepsilon_{BT}=0.55$ and $\varepsilon_{HT}=0.85$) over a range of 20 to 50° C., with a switching temperature around 35° C. It should be noted that there is an increase in the high value of the emissivity that is favorable to the dissipation of heat.

One can appreciate in FIGS. 7 and 8, the beneficial effect of a solar protection consisting of a double centering Bragg mirror ($\lambda_0$ (1)=550 nm and $\lambda_0$ (2)=825 nm) on the reduction, decrease in the solar absorptivity at 22° C. of two thermochromic devices according to the invention.

The first device comprises a layer with a thickness of 40 nm of active material doped with 2% in the state of high infrared emissivity ($VO_2$ doped with tungsten), wherein a decreases from 0.49 to 0.34 (FIG. 7).

The second 2% doped device comprises a layer with a thickness of 50 nm of active material in the state of low infrared emissivity ($VO_2$ doped with tungsten), wherein a decreases from 0.59 to 0.38 (FIG. 8).

The invention claimed is:

1. A solid-state thermochromic device comprising a stack, wherein the stack comprises, successively, from a rear face to a front face exposed to solar radiation:
    a) a solid substrate made of an inorganic material resistant up to a temperature of 550° C.;
    b) an infrared-reflective layer made of an electronically-conductive material;
    c) electronically insulating interface layers;
    d) an electronically insulating inorganic dielectric layer transparent to infrared radiation, made of cerium oxide $CeO_2$, with a thickness of 400 to 900 nm;
    e) electronically insulating interface layers;
    f) a layer of an infrared-active thermochromic material which is an n-doped $VO_2$ vanadium IV oxide, and crystallized in a monoclinic or rutile phase, having a thickness of 30 to 50 nm; and g) a solar protective coating, solar reflective coating, transparent to infrared radiation.

2. A device according to claim 1, wherein the solid substrate is made of a material selected from: aluminum, silicon, borosilicate glasses.

3. A device according to claim 1, wherein the solid substrate is in a form of a layer.

4. A device according to claim 1, wherein the electronically-conductive material of infrared-reflective layer b) is selected from metals, noble metals, gold, silver or platinum; aluminum, and chromium; metal alloys; and electronically-conductive metal oxides transparent in visible range, tin-doped indium oxide (ITO), fluorine-doped tin oxide (FTO), antimony-doped tin oxide (ATO), or aluminum-doped zinc oxide (AZO).

5. A device according to claim 1, wherein the reflective layer b) has a thickness of 80 to 150 nm.

6. A device according to claim 1, wherein the interface layers c) are 2 in number.

7. A device according to claim 1, wherein the interface layers c) have a total thickness of 10 to 30 nm.

8. A device according to claim 1, wherein the interface layers c) comprise, starting from the reflective layer, a first layer of $Si_3N_4$ or of AlN, then a second layer of $SiO_2$ or $Al_2O_3$.

9. A device according to claim 8, wherein the first layer of $Si_3N_4$ or AlN has a thickness of 5 to 15 nm, and the second layer of $SiO_2$ or $Al_2O_3$ has a thickness of 5 to 15 nm.

10. A device according to claim 1, wherein the interface layers e) are 2 in number.

11. A device according to claim 1, wherein the interface layers e) have a total thickness of 105 to 155 nm.

12. A device according to claim 1, wherein the interface layers e) comprise, starting from the reflective layer, a first layer of $SiO_2$, then a second layer of $Si_3N_4$.

13. A device according to claim 12, wherein the first layer of $SiO_2$ has a thickness of 5 to 15 nm, and the second layer of $Si_3N_4$ has a thickness of 100 to 140 nm.

14. A device according to claim 1, wherein the vanadium IV oxide, $VO_2$, is n-doped with oxygen vacancies and/or by substitution of the $V^{4+}$cations using $Z^{n+}$metal cations, having a valency n greater than 4.

15. A device according to claim 14, wherein the vanadium IV oxide, $VO_2$, is n-doped only by oxygen vacancies, and corresponds to the formula $VO_2$, wherein x is from 0 exclusive to 0.25 inclusive.

16. A device according to claim 14, wherein the vanadium IV oxide, $VO_2$, is n-doped only by substitution of the $V^{4+}$cations using $Z^{n+}$metal cations, having a valency n greater than 4, and corresponds to the formula $V_{1-y}Z_yO_2$, wherein y ranges from 0.01 to 0.03.

17. A device according to claim 14, wherein n is equal to 5 or 6, and Z is selected from: Nb, Ta, Mo, or W.

18. A device according to claim 14, wherein the vanadium IV oxide, $VO_2$, is n-doped at a same time by oxygen vacancies and by substitution of the $V^{4+}$cations using $Z^{n1}$ metal cations, having a valency n greater than 4, and corresponds to the formula $V_{1-y}Z_yO_{2-x}$.

19. A device according to claim 1, wherein the solar protective coating, solar reflective coating, transparent to infrared g), includes a Bragg mirror.

20. A device according to claim 19, wherein the Bragg mirror consists of an alternation of a layer of a metal oxide of high refractive index (n of 2 to 2.5) and of a layer of a metal oxide of low refractive index (n of 1.3 to 1.8).

21. A device according to claim 1, wherein the stack consists of, successively, from the rear face to the front face, elements a) to g).

22. An object including the device of claim 1.

23. The object according to claim 22, wherein the object comprises one of a satellite, building, and passenger compartment of a vehicle.

24. The object according to claim 23, wherein the vehicle comprises one of an automobile, aircraft, train or vessel.

25. A method for producing the device according to claim 1, comprising:

a) deposition of the infrared-reflective layer made of the electronically-conductive material on the solid substrate of inorganic material resistant up to a temperature of 550° C.;

b) deposition of electronically insulating interface layers on the infrared-reflective layer deposited during a);

c) deposition of the electronically insulating inorganic dielectric layer transparent to infrared radiation, made of cerium oxide $CeO_2$, having the thickness of 400 to 900 nm, on the interface layers deposited during b);

d) deposition of electronically insulating interface layers on the electronically insulating dielectric layer, transparent to infrared radiation, made of cerium oxide $CeO_2$, and deposited during c);

e) deposition of a layer of an infrared-active thermochromic material, which is an undoped vanadium oxide $VO_2$, or a vanadium oxide doped with oxygen vacancies $VO_{2-x}$, in a monoclinic phase, on the interface layers deposited during d), and intercalation of ultrafine layers, with a thickness of 0.1 to 0.5 nm of a metal Z, in the layer of undoped vanadium oxide $VO_2$;

f) annealing of the substrate, and of the layers deposited during a) to e) at a temperature of more than 450° C. to less than 550° C., to crystallize the thermochromic material; and g) deposition of the solar protective coating, solar reflective coating, transparent in the infrared, on the layer of thermochromic material.

26. A method according to claim 25, wherein annealing of the substrate, and of the layers deposited during a) to e), is carried out under an argon and oxygen atmosphere containing at least 96% by volume of argon.

27. A method according to claim 25, wherein the layers and the solar protective coating are deposited by a physical vapor deposition method (PVD) selected from: magnetron cathode sputtering, laser ablation, and evaporation.

28. A method according to claim 27, wherein all the layers and the solar protective coating, are deposited under vacuum by a same physical vapor deposition method.

29. A method according to claim 25, wherein a)-g) are carried out, in a same vacuum chamber, continuously, without opening a chamber between each of a)-g).

30. A method according to claim 25, wherein e) comprises deposition of vanadium oxide doped with oxygen vacancies $VO_{2-x}$, in the monoclinic phase, on the interface layers deposited during d), and intercalation of ultrafine layers, with a thickness of 0.1 to 0.5 nm of a metal Z, in the layer of vanadium oxide doped with oxygen vacancies $VO_{2-x}$.

31. A method according to claim 25, wherein Z comprises tungsten.

* * * * *